(No Model.) 4 Sheets—Sheet 1.
S. DAVIS.
DISTANCE INSTRUMENT.
No. 456,404. Patented July 21, 1891.
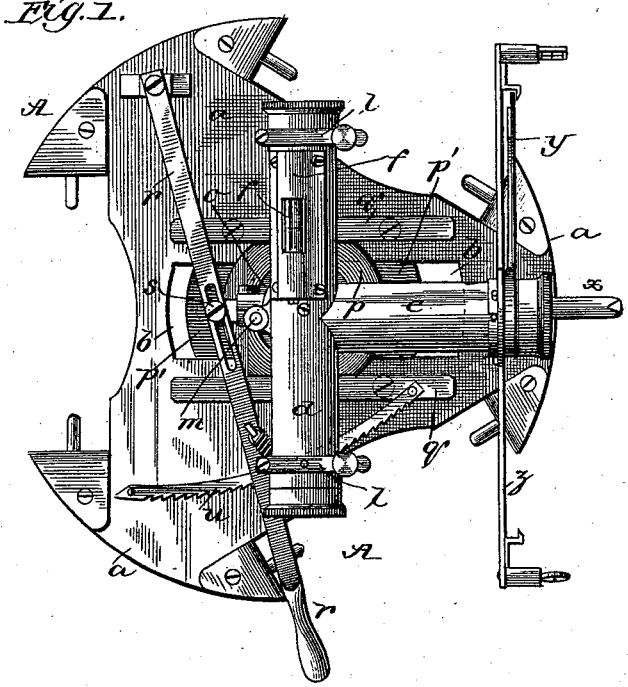
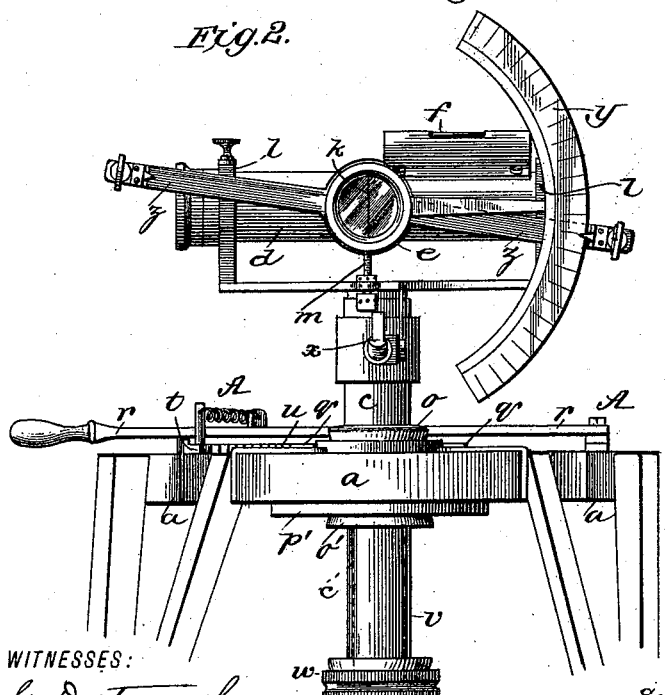
WITNESSES:
Fred G. Dieterich
Amos W. Hart
INVENTOR:
Solomon Davis.
BY Munn & Co
ATTORNEYS (No Model.) 4 Sheets—Sheet 2.

S. DAVIS.
DISTANCE INSTRUMENT.

No. 456,404. Patented July 21, 1891.

WITNESSES:
Fred G. Dieterich
Amos W. Hart

INVENTOR:
Solomon Davis.

BY
ATTORNEYS (No Model.) 4 Sheets—Sheet 3.
S. DAVIS.
DISTANCE INSTRUMENT.
No. 456,404. Patented July 21, 1891.
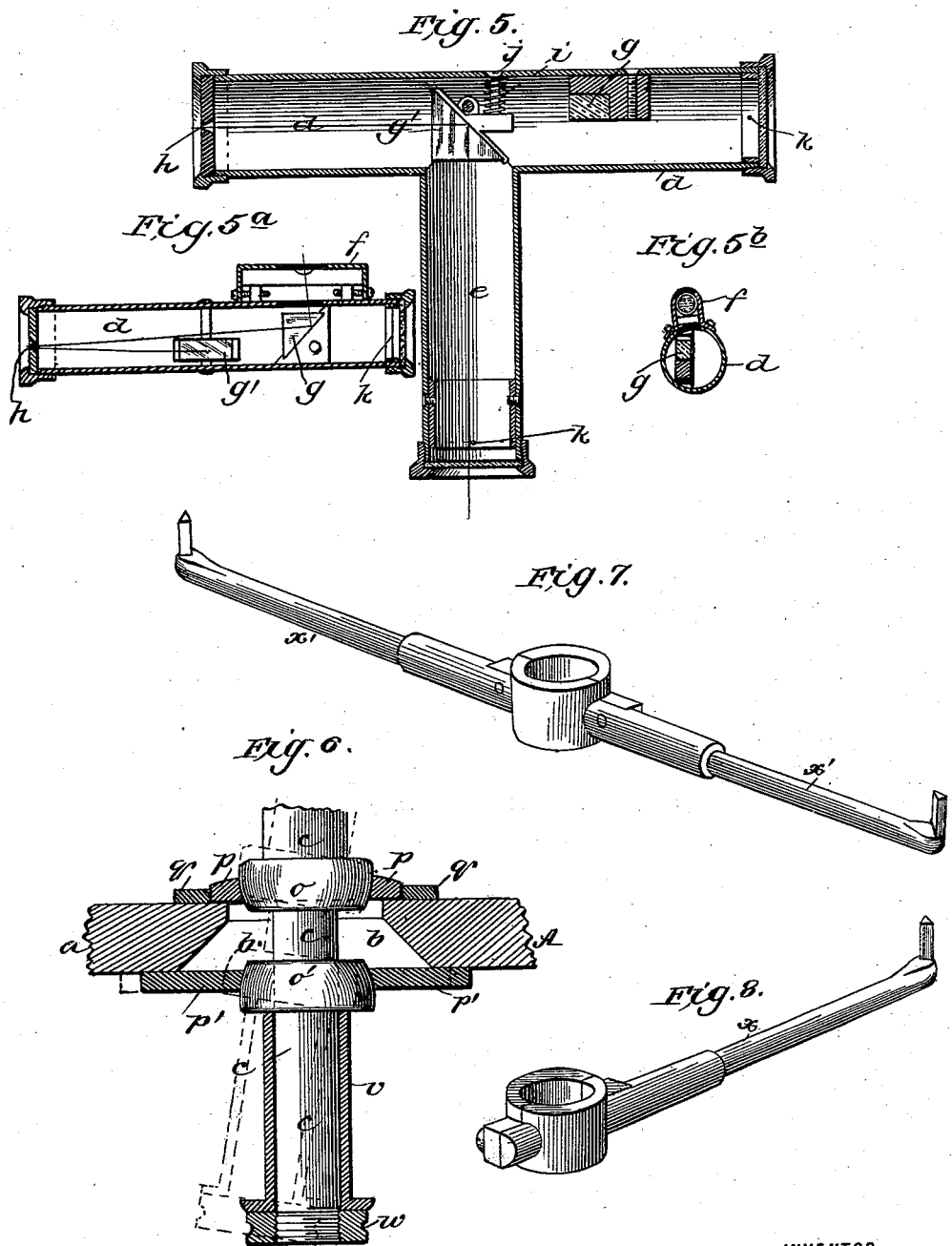
WITNESSES:
Fred G. Dieterich
Amos W. Hart
INVENTOR:
Solomon Davis.
BY Munn & Co.
ATTORNEYS
THE NORRIS PETERS CO., PHOTO-LITHO., WASHINGTON, D. C.

(No Model.) 4 Sheets—Sheet 4.
S. DAVIS.
DISTANCE INSTRUMENT.
No. 456,404. Patented July 21, 1891.
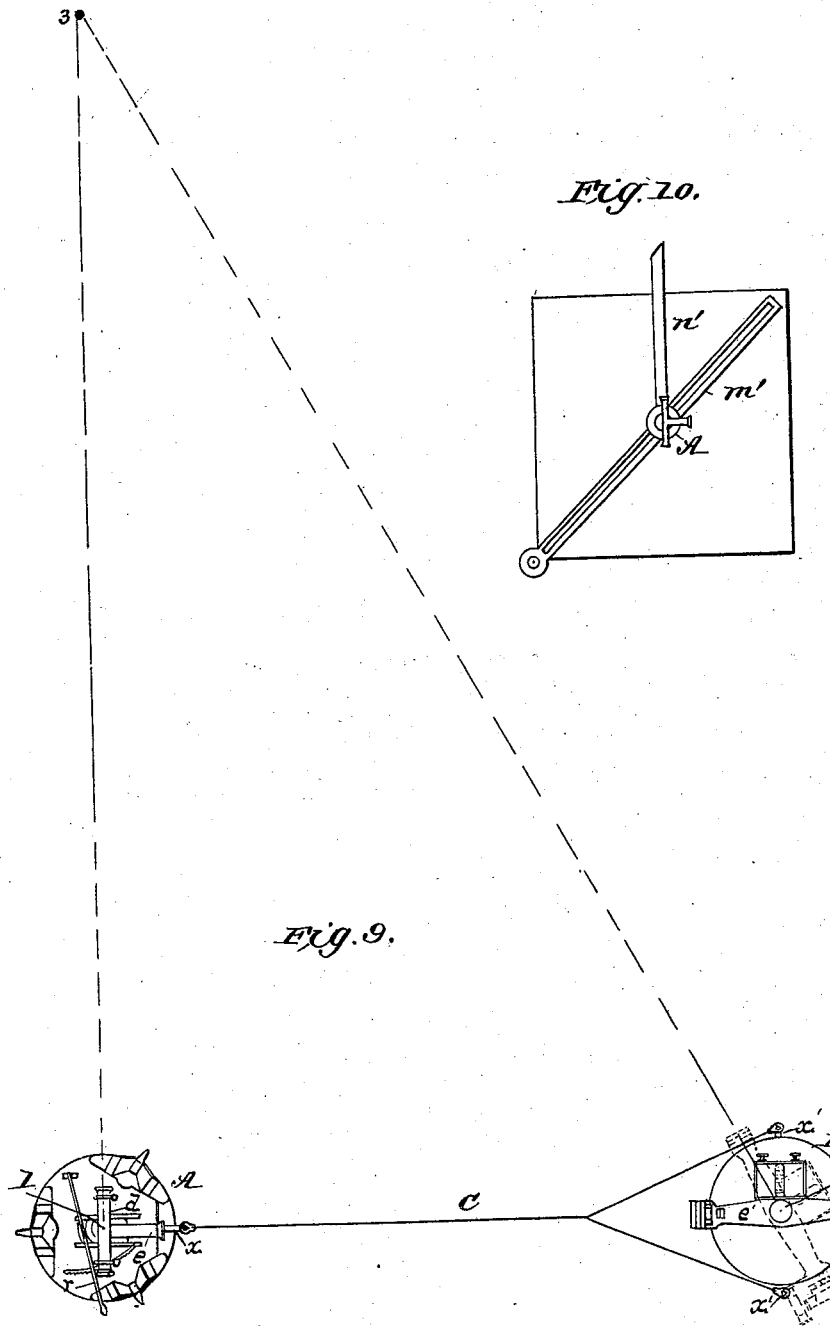
WITNESSES:
Fred G. Dieterich
Amos W. Hart
INVENTOR:
Solomon Davis.
BY Munn & Co
ATTORNEYS

UNITED STATES PATENT OFFICE.

SOLOMON DAVIS, OF NEW YORK, N. Y.

DISTANCE-INSTRUMENT.

SPECIFICATION forming part of Letters Patent No. 456,404, dated July 21, 1891.

Application filed February 4, 1890. Serial No. 339,203. (No model.)

*To all whom it may concern:*

Be it known that I, SOLOMON DAVIS, residing at New York city, State of New York, have invented an Improvement in Surveying Apparatus, of which the following is a specification.

My invention is an improvement in that class of surveying-instruments that are employed for measuring distances and magnitude or height of distant objects of triangulation. I obtain these objects without laying off a base line, and hence do it more easily and expeditiously than by the ordinary method of procedure. I also avoid much of the arithmetical calculation and labor incident to the old method.

In carrying out my invention I employ two instruments and a portable base-line of a predetermined or known length, which connects them and forms the base of the triangle the length of one side of which is required to be ascertained. Both these instruments are supported on tripods, and one of them has features that characterize the ordinary surveyor's level. It is used for determining one of the angles of the triangle. The other or distance instrument is similar in many respects to an ordinary azimuth or compass.

For convenience and brevity of description I will hereinafter designate the first or angling instrument by the capital letter A and the other or distance instrument by B. In connection with the angle-instrument I use a fixed vertical arc and swinging sight-bar for ascertaining vertical angles and magnitudes.

Figure 3:
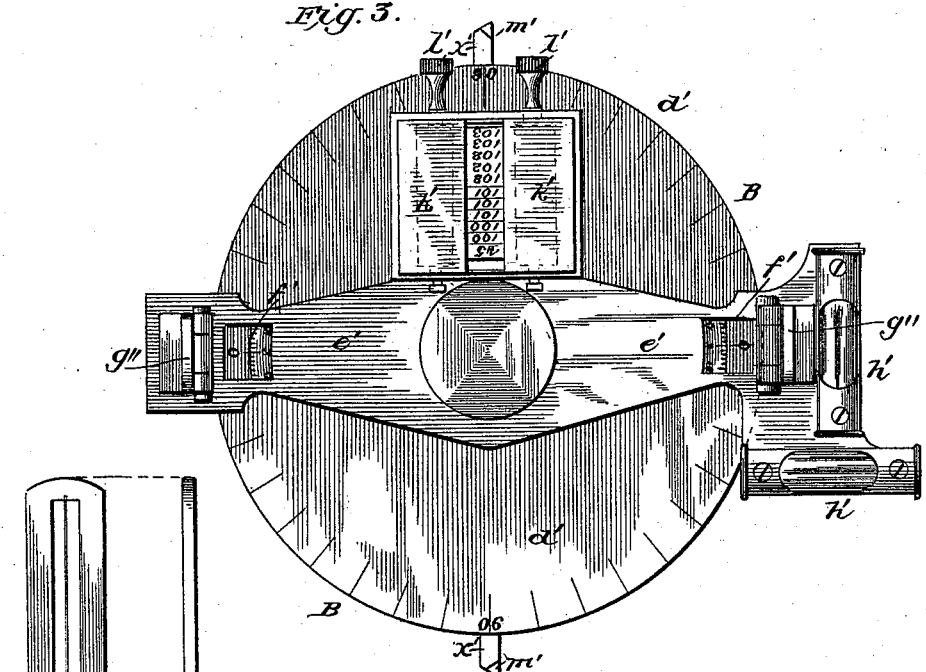
Figure 4:
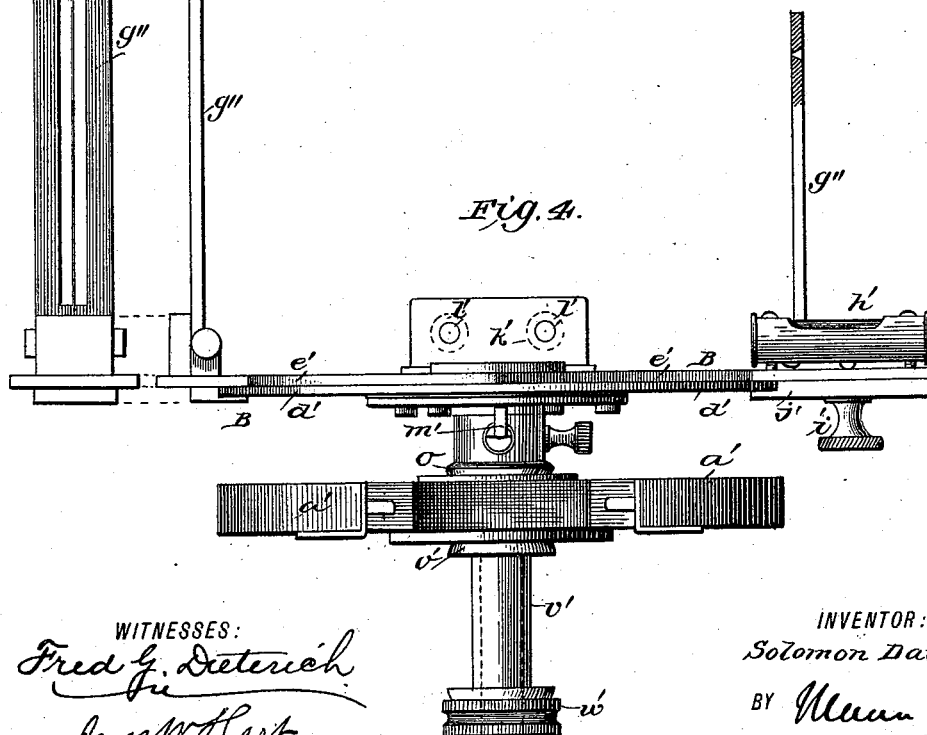

In the accompanying drawings, four sheets, Figure 1 is a plan view of the angle-instrument A without a supporting-tripod. Fig. 2 is a side view of the same, showing, also, a portion of the tripod. Fig. 3 is a plan view of the distance-instrument B. Fig. 4 is a side view of the same without tripod-legs. Fig. 5 is a horizontal section of the sight and lateral tubes of the angle-instrument A. Fig. 5ª is a longitudinal section of the sight-tube of the angle-instrument. Fig. 5ᵇ is a cross-section of the same. Fig. 6 is a vertical section showing the means for clamping either instrument A or B to the tripod-table. Figs. 7 and 8 are perspective views of the fixed and swinging arms of the two instruments A and B, to which the base-line is attached. Fig. 9 is a diagram illustrating the practical use of the instruments, and Fig. 10 is a plan view of a plane table to which one of the instruments is shown applied.

The working parts of the instrument A are supported upon a table having hinged legs, forming an ordinary tripod. This table *a* is provided with a slot *b*, through which the standard *c* that supports the main parts of the instrument projects. The said main parts are a sight-tube or telescope *d*, and a shorter lateral tube *e*, which is arranged at a right angle to the former and connected with it at the middle of its length. The sight-tube *d* has a spirit-level *f* attached to it, and is arranged over a lengthwise slot beneath which, in the interior of the tube, is arranged a right-angle prism *g*, for the purpose of reflecting the bubble in the spirit-level *f* to the eye-hole *h*. Another right-angle prism *g'* is located in the sight-tube *d* in diagonal position directly opposite the lateral tube *e*. It is adapted to turn on a pin and held at the required angle by means of a helical spring *i* and an adjusting-screw *j*. This prism *g'* reflects to the eye-hole *h* objects which are in line with the lateral tube *e*—that is to say, at right angles to the axis of the sight-tube *d*. The vertical cross-wires or sights *k* at the object ends of tubes *d* and *e* are made adjustable by an annular collar and screws, as usual. The sight-tube *d* is supported and secured by the usual Ys *l*, and the lateral tube *e* rests on an adjusting-screw *m*.

The standard *c*, upon which the tubes *d e* and their attachments are supported and with which they revolve, is provided with a conical collar *o*, that sits in a correspondingly-apertured socket-plate *p*. The latter rests on the tripod-table *a* and spans the slot *b* therein, Fig. 1. Two of its sides are straight and parallel and work in contact with guide flanges or ribs *q*, affixed to said table. A finger-lever *r* is pivoted to the table *a* and connected by a slot and pin at *s* with the socket-plate *p*, and serves to slide or adjust the latter one way or the other lengthwise of the table-slot *b* for the purpose of drawing the portable base-line C taut or slackening it, as the case may be, when the instruments A B are being used practically, as shown in Fig. 9. To hold said lever *r* locked in any adjustment, I employ a hinged pawl *t* and segmental ratchet-bar *u*, as shown. Beneath the table *a* is another socket-plate *p'*, that receives a conical collar *o'*, which is loose on the standard *c*, Fig. 6.

A tube $v$ supports this collar and is in turn supported by a milled nut $w$, screwed on the lower end of the standard $c$. It will be seen that when the nut $w$ is screwed up the tube $v$ will press the loose collar $o'$ against its socket-plate $p'$, and the fixed collar $o$ will be at the same time drawn down on its socket-plate $p$. In other words, both socket-plates $p\ p'$ will be drawn tightly against the intervening portions of the table $a$, and thus clamped immovably. This will, of course, hold the standard $c$ vertical or inclined at any desired angle, (as the inclination of the ground and the tripod may require.) A horizontal bar or arm $x$, having its outer end upturned, is attached to the standard $c$ above the tripod-table $a$ by means of a collar that turns freely. One end of the portable base-line C is attached to this arm (see Fig. 9) when the triangulation is being made.

An arc $y$ and reversible sight $z$ are applied to the outer end of the lateral tube $e$, as shown, Fig. 1. The arc is arranged vertical and fixed on the tube. The sight $y$ is parallel to the arc and is movable freely thereon. It consists of a bar having a disk with an eye-hole at one end and cross-wires at the other.

The arc and sight are used for determining the height of distant objects, which is effected by sighting first the base, then the top of the object, and thereby ascertaining the angle from which the required calculation can be made, as will be readily understood without detailed description.

The instrument B is supported upon a tripod and adjustably clamped to an apertured table $a'$ by means of a standard $b'$, collars $c\ c'$, tube $v'$, and milled nut $w'$, as in the case of the instrument A. The body or main parts of said instrument B are a graduated limb or plate $d'$, over which revolves a bar $e'$, having verniers $f'$ for measuring fractional angles and carrying hinged folding sights $g''$ and two spirit-levels $h'$, arranged at a right angle to each other adjacent to one of the sights $g''$. The bar $e'$ and its attachments may be secured to the graduated limb $d'$ in any required position by a screw $i'$ and clamp-plate $j'$, Fig. 4. A box $k'$ is also attached to the bar $e'$ and contains two rollers $l'$, on which is wound a ribbon imprinted with numbers arranged in rows and expressing the values in linear measure of the distances ascertained. The upper side of the box is slotted to allow convenient observation of the rows of figures on the ribbon. This attachment is a great convenience and an important aid to rapid determination of the distance of the object sighted. Two aligned arms $x'$ are affixed to the standard, so as to rotate with it, Figs. 3 and 8.

The practical adaptation and use of the instruments A B are based on the formula: "In a right-angle triangle, one side and two angles being known, the other sides and angle can be calculated."

Referring for illustration to Fig. 9, let it be required to determine the distance from 1 to 3. The instrument A is placed at 1, and the other B is placed a short distance to the right. The base-line C is then attached at one end to the swinging arm $x$ of instrument A, and the other branched end is similarly attached to the rigid divergent arms $x'$ of instrument B, and the latter is then moved laterally till the line C is stretched taut. For nicety of adjustment of tension of the base-line the lever $r$ may be pressed to move the sight-tubes $d\ e$ one way or the other, as required. The bar $e'$ of instrument B is then turned to sight on A, as shown by full lines in Fig. 9. Next the surveyor sights the object at 3 through tube $d$, and when the sights or cross-wires of said tube and the lateral tube are seen to coincide with each other and the vertical centers of the said object at 3 and the instrument B the tubes $d\ e$ are clamped securely in place. Then the bar $e'$ of instrument B is turned to sight the distant object at 3, (see dotted lines, Fig. 9,) and when this is done it is clamped to the limb $d'$. The angle of the bar $e'$ to its former position is then read off. If, for example, the angle be forty-five degrees, the distance (as ascertained by a brief calculation) is one hundred feet.

In Fig. 10 I show a plane table having a bar $m'$ pivoted to it near one corner. Said bar is slotted lengthwise and the instrument A is applied to the bar so as to be adjustable along the slot, and it is provided with alidade $n'$ for convenience in drawing lines of angles on the table.

Having thus described my invention, what I claim is—

1. The angle-instrument having the sight-tube $d$ provided exteriorly with a spirit-level, a subjacent slot, and a prism located interiorly beneath the slot for reflecting the bubble to the eye-hole $h$, the lateral tube $e$, arranged at a right angle to the sight-tube, and a mirror located interiorly at the junction of the two tubes and placed oblique to each other for reflecting a lateral object to the eye-hole, as shown and described.

2. The combination, with the tripod-table having a slot, a surveying-instrument proper whose standard projects through the slot, a plate which supports said instrument, ribs for guiding the plate, a lever for adjusting the latter, and means for holding the lever, as shown and described.

3. The combination of the portable base-line with the distance-instrument B, the angle-instrument A, a laterally-adjustable standard supporting the sight-tube of the latter, the slotted tripod-table, and means for adjusting said standard laterally and for clamping it to any required adjustment, as specified.

SOLOMON DAVIS.

Witnesses:
HARRY CLAY LINCKS,
CHARLES LEVIN DAVIS.